E. A. GARRAND.
SLIP GEAR.
APPLICATION FILED DEC. 8, 1914.

1,165,772.

Patented Dec. 28, 1915.

WITNESSES:

INVENTOR
Eugene A. Garrand
BY
Frank S. Busser
ATTORNEY.

UNITED STATES PATENT OFFICE.

EUGENE A. GARRAND, OF CAMDEN, NEW JERSEY, ASSIGNOR TO PHILADELPHIA GEAR WORKS, OF PHILADELPHIA, PENNSYLVANIA, A CORPORATION OF NEW JERSEY.

SLIP-GEAR.

1,165,772.

Specification of Letters Patent.

Patented Dec. 28, 1915.

Application filed December 8, 1914. Serial No. 876,027.

*To all whom it may concern:*

Be it known that I, EUGENE A. GARRAND, a citizen of the United States, residing at Camden, county of Camden, and State of New Jersey, have invented a new and useful Improvement in Slip-Gears, of which the following is a full, clear, and exact description, reference being had to the accompanying drawings, which form a part of this specification.

In a power driven loom provision is made for stopping the loom immediately upon the breaking of a thread. Simultaneously therewith the current to the driving motor is cut off. It is desirable, however, to allow the motor to stop gradually, notwithstanding the relatively sudden stoppage of the loom shaft. This purpose may be conveniently and effectively attained by providing a slip gear connection between the motor shaft and the loom shaft.

The special object of my invention is to provide a slip gear adapted to the special purpose above mentioned but which is also applicable to practically all situations in which gearing is employed and in which it is desirable or necessary for the power transmitting connection to be disrupted or modified in the event of sudden or abnormal resistance to movement of the driven mechanism.

Figure 1:
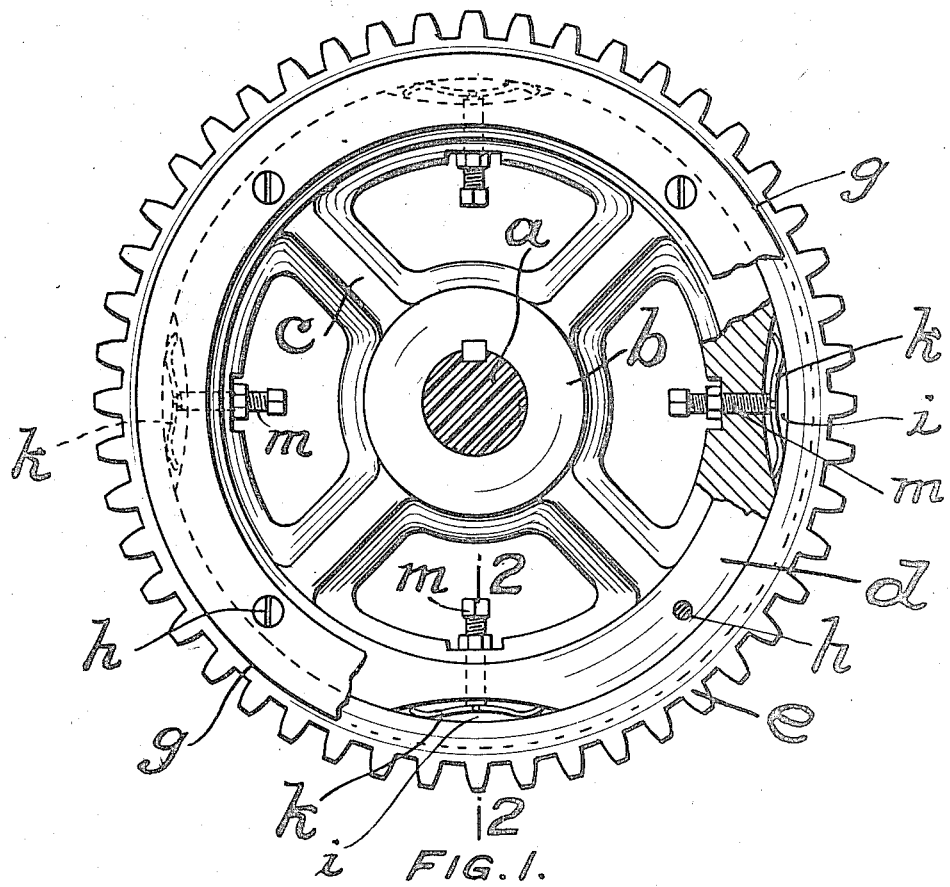
Figures 2, 3:
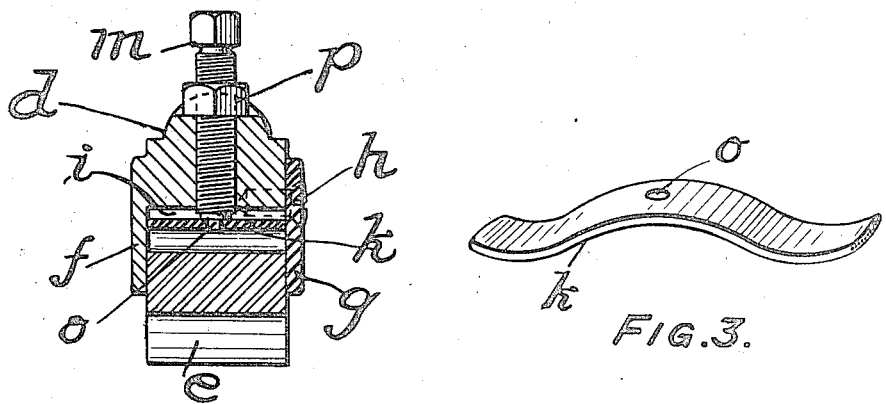

In the drawings, which illustrate a preferred embodiment of my invention, Figure 1 is a side elevation of my improved gear partly broken away. Fig. 2 is an enlarged section on the line 2—2 of Fig. 1. Fig. 3 is an enlarged perspective view of one of the springs.

The shaft $a$ may be assumed to be the driven shaft to which is keyed the slip gear embodying my invention, which may be assumed to be driven from a pinion, not shown, on the motor shaft. The wheel body is composed of the hub $b$, the spokes $c$ and felly $d$. Surrounding and contacting with the periphery of the felly $d$ is an annular gear or toothed ring $e$. Applied to each side of the felly are the annular side plates $f$, $g$, which extend out beyond the periphery of the felly and partly inclose between them the ring $e$. One of the side plates $f$ may be permanently secured to, or integral with, the felly, while the side plate $g$ is removable, for assembly purposes as hereinafter described, being secured to the felly by screws $h$.

At several points along its periphery, the felly is provided with shallow recesses $i$. These recesses have a concave bottom and together with the inside face of the ring $e$ form closed chambers for the reception of the leaf springs $k$, one of which is shown in perspective in Fig. 3. Each spring $k$ is curved throughout its central part like a bow, while the ends thereof are reversely curved as shown.

Extending radially through the felly are adjusting screws $m$ each having at its outer end a reduced neck $n$ adapted to enter a hole $o$ in the center of a spring $k$. A jam nut $p$ is threaded on each screw $m$ and engages the inside face of the felly to hold the screw $m$ in its adjusted position.

In assembling the parts, the ring $e$ is slipped sidewise on the felly $d$. Then the springs $k$ are slipped sidewise into the recesses $i$. Then the side plate $g$ is applied and secured in position, thus inclosing the recesses $i$ and the springs $k$ therein. The screws $m$ are then adjusted to produce the desired tension upon the springs. The frictional contact between the toothed ring $e$ and the felly $d$ is not sufficient, independently of the springs $k$, to establish driving connection between ring and felly; but by adjusting the screws $m$, the tension of the springs $k$ may be regulated so as to establish the desired resistance to movement of the wheel body relative to the outer ring. Thus the frictional engagement between the two members may be regulated so that the gear $e$ drives the shaft $a$ under normal conditions, whereas in the event that shaft $a$ is stopped or if an abnormal resistance movement is imposed upon the shaft, the stoppage or sudden slowing down of the latter will not be positively transmitted back to the motor shaft, the ring $e$ overcoming the frictional resistance between it and the wheel body and revolving relatively thereto.

One of the pronounced advantages of my invention is that the frictional resistance between the wheel body and the surrounding ring may be modified to a substantial degree by adjusting but one of the screws $m$, it being unnecessary, in order to uniformly distribute the friction, to adjust all the screws to the same degree so that all the springs will be compressed to the same extent. Another obvious advantage of the invention is the simplicity of the construction and the readiness with which the parts may be assembled.

Having now fully described my invention, what I claim and desire to protect by Letters Patent is:

1. A slip gear comprising an outer toothed ring, having a smooth unrecessed inner face, an inner wheel body having recesses in its periphery but otherwise presenting a smooth periphery having a frictional contact with the inner face of the ring, and tension devices confined within said recesses and contacting with the inner face of the ring and establishing a driving contact between said body and ring.

2. A slip gear comprising an outer toothed ring, an inner wheel body having a recess in its periphery, a spring confined within said recess, and a screw extending radially through the wheel body and pressing the spring against the inner face of the ring.

3. A slip gear comprising an outer toothed ring, an inner wheel body having a comparatively shallow recess, and a leaf spring confined within the recess and pressing against the inner face of the ring.

4. A slip gear comprising an outer toothed ring, an inner wheel body having a comparatively shallow recess, a leaf spring having its central portion bent inwardly and its end portions reversely curved and contacting with the inner face of the ring.

5. A slip gear comprising an outer toothed ring, an inner wheel body having a comparatively shallow recess, a leaf spring having its central portion bent inwardly and its end portions reversely curved and contacting with the inner face of the ring, and an adjusting screw extending radially through the wheel body and engaging the inwardly bent central portion of the ring.

6. A slip gear comprising an outer toothed ring, an inner wheel body having a comparatively shallow recess, a leaf spring confined within the recess, and an adjusting screw extending radially through the wheel body and having a reduced neck engaging an orifice in the spring.

7. A slip gear comprising a wheel body composed of a hub, spokes and felly, an outer toothed ring, the felly being cut away on its face to form a comparatively shallow recess, a leaf spring confined within said recess, and a screw extending radially through the felly into said recess and by means of which the tension of the spring is regulated.

8. A slip gear comprising an outer toothed ring, presenting a smooth unrecessed inner face, an inner wheel body having a recess in its periphery but otherwise presenting a smooth periphery, said recess opening toward the side of the wheel, and a spring, exerting tension in a radial direction, confined within said recess and insertible and removable through said side opening.

9. A slip gear comprising a wheel body composed of a hub, spokes and felly, an outer toothed ring adapted to be slipped sidewise on the felly, the felly being cut away on its face to form a comparatively shallow recess opening at the side thereof, a leaf spring insertible through said opening into said recess, an annular side plate closing said opening and overlapping the ring and felly, and a screw extending radially through the felly whereby the tension of the spring is adjusted.

10. A slip gear comprising a wheel body, composed of a hub, spokes and felly, the latter having an integral annular side plate projecting beyond its periphery, an outer toothed ring slidable sidewise on the felly against the side plate, the felly being cut away to form a comparatively shallow recess opening at the side thereof, a leaf spring insertible through said opening into said recess, an annular side plate closing said opening and overlapping the ring and felly, and screws securing the side plate to the felly.

In testimony of which invention, I have hereunto set my hand, at Philadelphia, Pa., on this 20th day of November, 1914.

EUGENE A. GARRAND.

Witnesses:
 FRANK S. BUSSER,
 E. E. WALL.